US009749254B2

(12) United States Patent
Ficara (10) Patent No.: US 9,749,254 B2
(45) Date of Patent: Aug. 29, 2017

(54) HIERARCHICAL SCHEDULER FOR DETERMINISTIC NETWORKING

(71) Applicant: Cisco Technology, Inc., San Jose, CA (US)

(72) Inventor: Domenico Ficara, Essertines-sur-Yverdon (CH)

(73) Assignee: Cisco Technology, Inc., San Jose, CA (US)

( * ) Notice: Subject to any disclaimer, the term of this patent is extended or adjusted under 35 U.S.C. 154(b) by 406 days.

(21) Appl. No.: 14/280,814

(22) Filed: May 19, 2014

(65) Prior Publication Data

US 2015/0333857 A1  Nov. 19, 2015

(51) Int. Cl.
*H04L 12/869* (2013.01)
*H04J 3/24* (2006.01)
*H04L 12/875* (2013.01)

(52) U.S. Cl.
CPC ............. *H04L 47/60* (2013.01); *H04J 3/247* (2013.01); *H04L 47/56* (2013.01)

(58) Field of Classification Search
None
See application file for complete search history.

(56) References Cited

U.S. PATENT DOCUMENTS

| | | | | |
|---|---|---|---|---|
| 4,575,798 A * | 3/1986 | Lindstrom | ................ | G06F 7/24 |
| 5,781,531 A * | 7/1998 | Charny | ............... | H04L 12/5602 370/232 |
| 6,091,440 A * | 7/2000 | Kokkinen | ............. | H04J 3/1647 348/E7.07 |
| 7,649,912 B2 | 1/2010 | Balasubramanian et al. | | |
| 8,018,953 B1 | 9/2011 | Zhao | | |
| 8,144,584 B1 * | 3/2012 | Voruganti | ............. | H04L 47/522 370/232 |
| 8,295,287 B2 | 10/2012 | Chandhoke | | |
| 8,422,390 B2 | 4/2013 | Siwko et al. | | |
| 8,462,791 B2 | 6/2013 | Jiang | | |
| 2006/0215581 A1 * | 9/2006 | Castagnoli | .......... | H04L 12/2602 370/254 |
| 2006/0215583 A1 | 9/2006 | Castagnoli | | |
| 2009/0213822 A1 * | 8/2009 | Keshavarzian | ......... | H04L 47/10 370/338 |
| 2010/0182170 A1 * | 7/2010 | Ylonen | ................... | H03M 7/40 341/65 |

(Continued)

OTHER PUBLICATIONS

Lee, Tony T., "The Kraft's Inequality of Scheduling for Packet-Switched Clos Networks", The 27th Conference on Computer Communications, INFOCOM 2008, Apr. 2008, pp. 101-105, IEEE, Phoenix, AZ.

(Continued)

*Primary Examiner* — Anh-Vu Ly
*Assistant Examiner* — Roberta A Shand
(74) *Attorney, Agent, or Firm* — Parker Ibrahim & Berg LLC; James M. Behmke; Stephen D. LeBarron (57) ABSTRACT

In one embodiment, a method is disclosed in which a device identifies a set of data stream rates for a plurality of data streams. A Huffman tree is constructed for data transmission time slots based on the set of data stream rates. A number of time slots assigned to a parent node in the tree are determined and evenly distributed to child nodes of the parent node, to assign the time slots to the data streams.

20 Claims, 8 Drawing Sheets

(56) References Cited

U.S. PATENT DOCUMENTS

2015/0023205 A1* 1/2015 Vasseur .................. H04L 45/42
370/254

OTHER PUBLICATIONS

Lee, Tony T., "The Mathematical Parallels Between Packet Switching and Information Transmission", Computing Research Repository, vol. abs/cs/061, Oct. 2006, 21 pages.
Wikipedia, "Huffman Coding", Internet Page: http://en.wikipedia.org/wiki/Huffman_tree, printed May 19, 2014, 12 pages, The Wikimedia Foundation, Inc.
Wikipedia, "Weighted Fair Queuing", Internet Page: http://en.wikipedia.org/wiki/weighted_fair_queuing, printed Apr. 7, 2014, 2 pages, The Wikimedia Foundation, Inc.
Shivakumar, N. et al.: "Efficient Indexing for Broadcast Based Wireless Systems," Mobile Networks and Applications, ACM, New York, NY, US, vol. 1, No. 4, Jan. 1, 1996, pp. 433-446.
Extended European Search Report and European Search Opinion dated Sep. 16, 2015 in connection with European Application No. 15159964.

* cited by examiner

| LAYER | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 1 | A |   | A |   | A |   | A |   | A |   | A |   | A |   | A |   |
| 2 |   | B |   |   |   | B |   |   |   | B |   |   |   | B |   |   |
| 3 |   |   |   | C |   |   |   |   |   |   |   | C |   |   |   |   |
| 4 |   |   |   |   |   |   |   | D |   |   |   |   |   |   |   | D |
| SCHEDULE | A | B | A | C | A | B | A | D | A | B | A | C | A | B | A | D |

| LAYER | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 1 | | | | | | | | | | | | | | | | |
| 2 | J | K | L | | J | K | L | | J | K | L | | J | K | L | |
| 3 | | | | J | | | | K | | | | L | | | | M |
| 4 | | | | | | | | | | | | | | | | M |
| SCHEDULE | J | K | L | J | J | K | L | K | J | K | L | L | J | K | L | M |

HIERARCHICAL SCHEDULER FOR DETERMINISTIC NETWORKING

TECHNICAL FIELD

The present disclosure relates generally to computer networks, and, more particularly, to deterministic networks.

BACKGROUND

In general, deterministic networking attempts to precisely control when a data packet arrives at its destination. This category of networking has seen increased interest in a myriad of applications such as industrial automation, vehicle control systems, and other systems that require the precise delivery of control commands to a controlled device. One such deterministic protocol is Deterministic Ethernet, which promises no packet loss and reduced jitter for time sensitive traffic. This is accomplished through careful ad-hoc scheduling of streams that is mostly done off-line and often enforces some constraints to streams.

Because of the time sensitivity and zero packet loss constraints in Deterministic Ethernet, each network node has to be synced with a main clock and bridges have to follow a specific scheduling. Usually an entity called a path computation element (PCE) that knows the network topology, the constraints of the networks, and the requirements of the data streams, is in charge of defining the path and the scheduling algorithm for each node of the network. Among all these constraints, scheduling network traffic in Deterministic Ethernet applications is simplified somewhat because data streams are periodic, thereby allowing stream scheduling to be solved within one time period.

Jitter control is paramount in deterministic applications and can make or break a possible traffic schedule. In Deterministic Ethernet and other deterministic networking applications, delay sensitive flows can only be scheduled if a very well controlled jitter is possible. However, developing new scheduling techniques that reduce jitter in deterministic networks is both challenging and difficult.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device identifies a set of data stream rates for a plurality of data streams. A Huffman tree is constructed for data transmission time slots based on the set of data stream rates. A number of time slots assigned to a parent node in the tree are determined and evenly distributed to child nodes of the parent node, to assign the time slots to the data streams.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
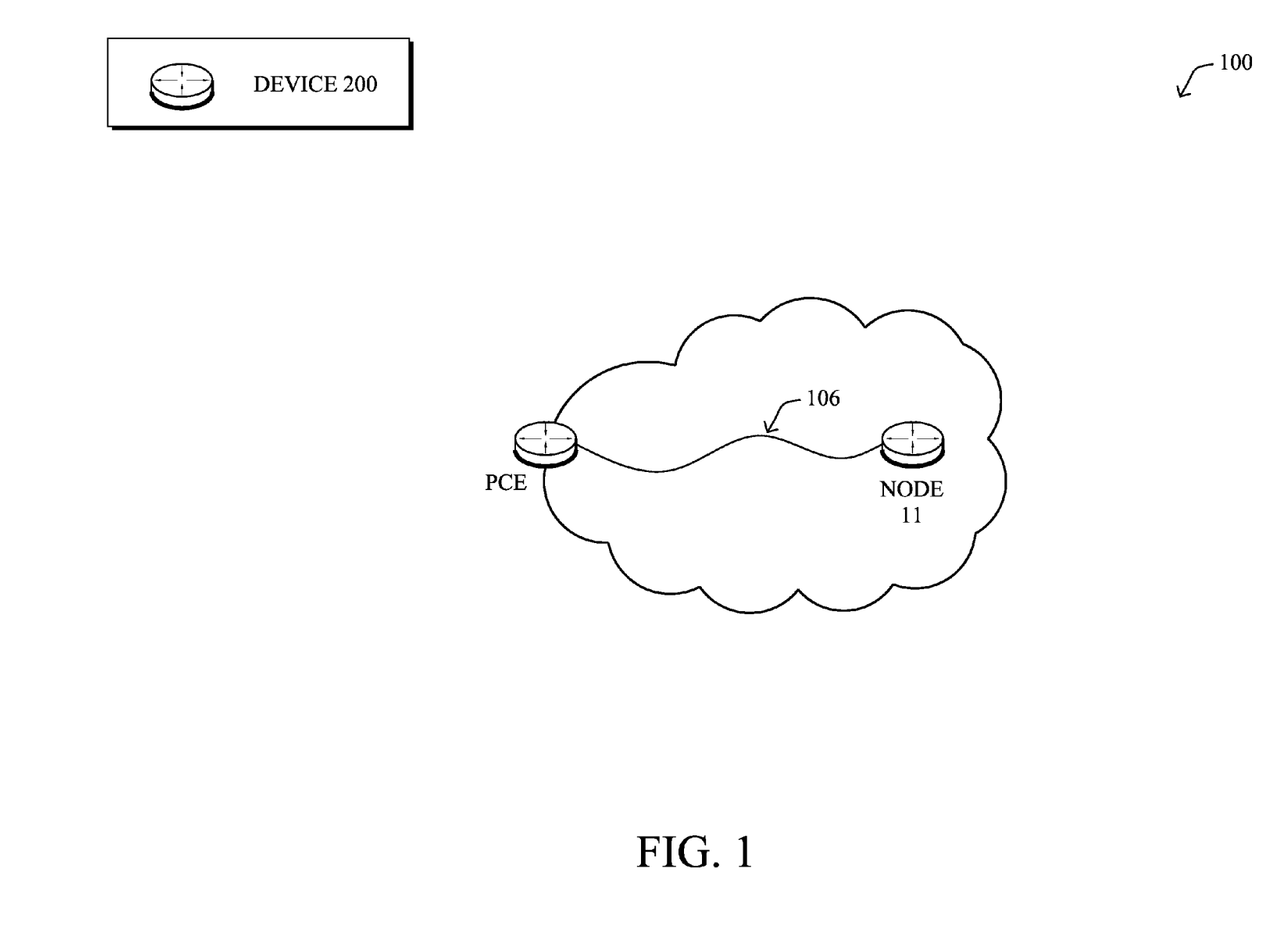
FIG. 1 illustrates an example communication network.

FIG. 1 is a schematic block diagram of an example computer network 100 illustratively comprising nodes/devices 200 interconnected by various methods of communication. Those skilled in the art will understand that any number of nodes, devices, links, etc. may be used in the computer network, and that the view shown herein is for simplicity. Network 100 may also include a path computation element (PCE) that determines a communication path 106 via which data is routed through any number of intermediary nodes to arrive at a node 11.

According to some embodiments, network 100 is a deterministic network that implements a deterministic protocol, such as Deterministic Ethernet. In other words, the scheduling and delivery of packets within network 100 to node 11 may be precisely timed by the PCE. For example, the nodes/devices in network 100 may use a shared timing mechanism to coordinate the sending and receipt of data packets within network 100.

Figure 2:
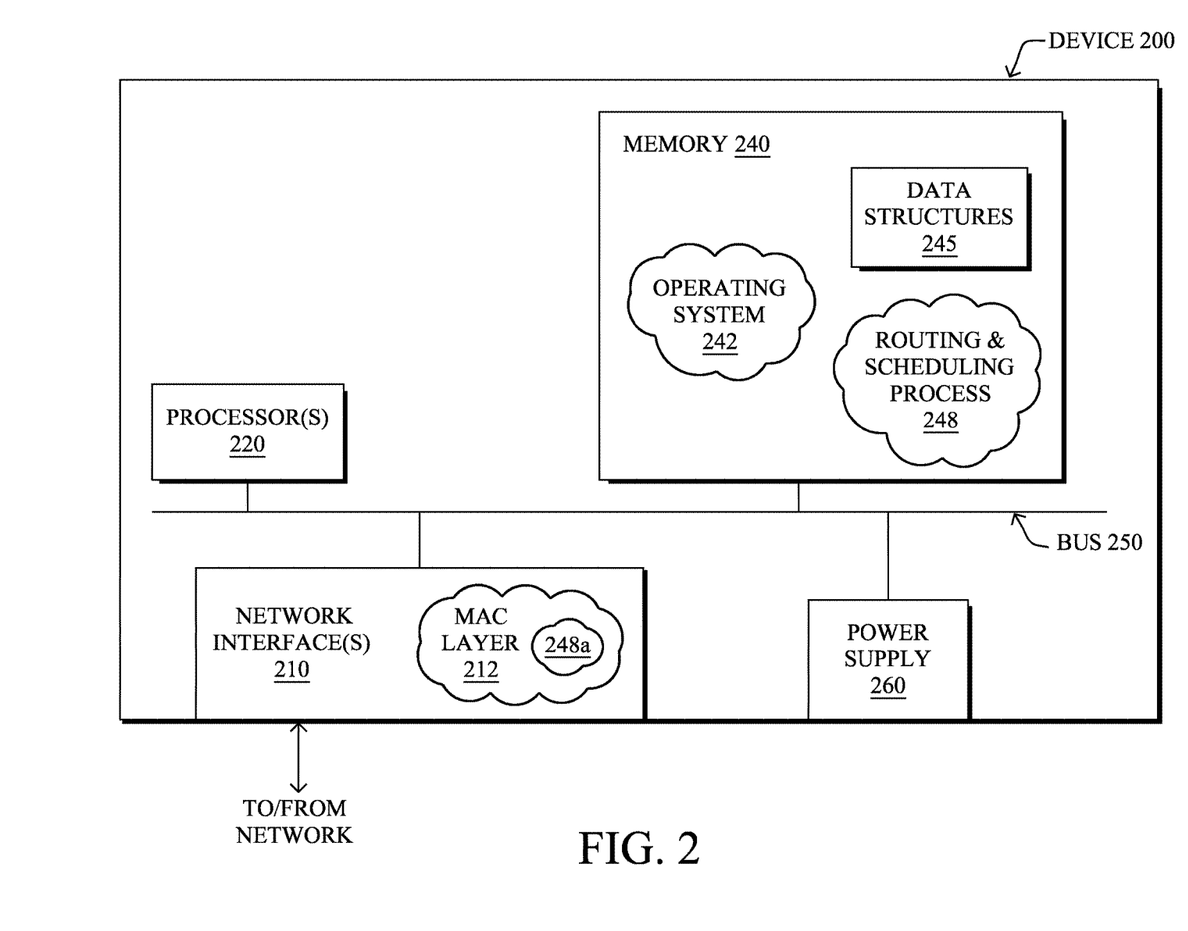
FIG. 2 illustrates an example network device/node.

FIG. 2 is a schematic block diagram of an example node/router 200 that may be advantageously used with one or more embodiments described herein, e.g., as an interested node, a Path Computation Element (PCE), etc., as detailed below. The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures, e.g., buffers/queues 241. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the router. These software processes and/or services may comprise routing and scheduling process 248. It will be apparent to those skilled in the art that other processor and memory means, including various computer-readable media, may be used to store and execute program instructions pertaining to the inventive technique described herein. Note that while root bypass process 248 is shown in centralized memory 240, alternative embodiments provide for the process to be specifically operated within the network interfaces 210 (process "248 a" as part of MAC layer 212).

Routing and scheduling process 248 contains computer executable instructions executed by each processor 220 to perform functions provided by one or more routing protocols, such as the Interior Gateway Protocol (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing and scheduling services 248 may also perform functions related to virtual routing protocols, such as maintaining VRF instances (not shown) as will be understood by those skilled in the art. In addition, routing and scheduling process 248 may implement deterministic routing by scheduling the transmittal and/or delivery of packets within the network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
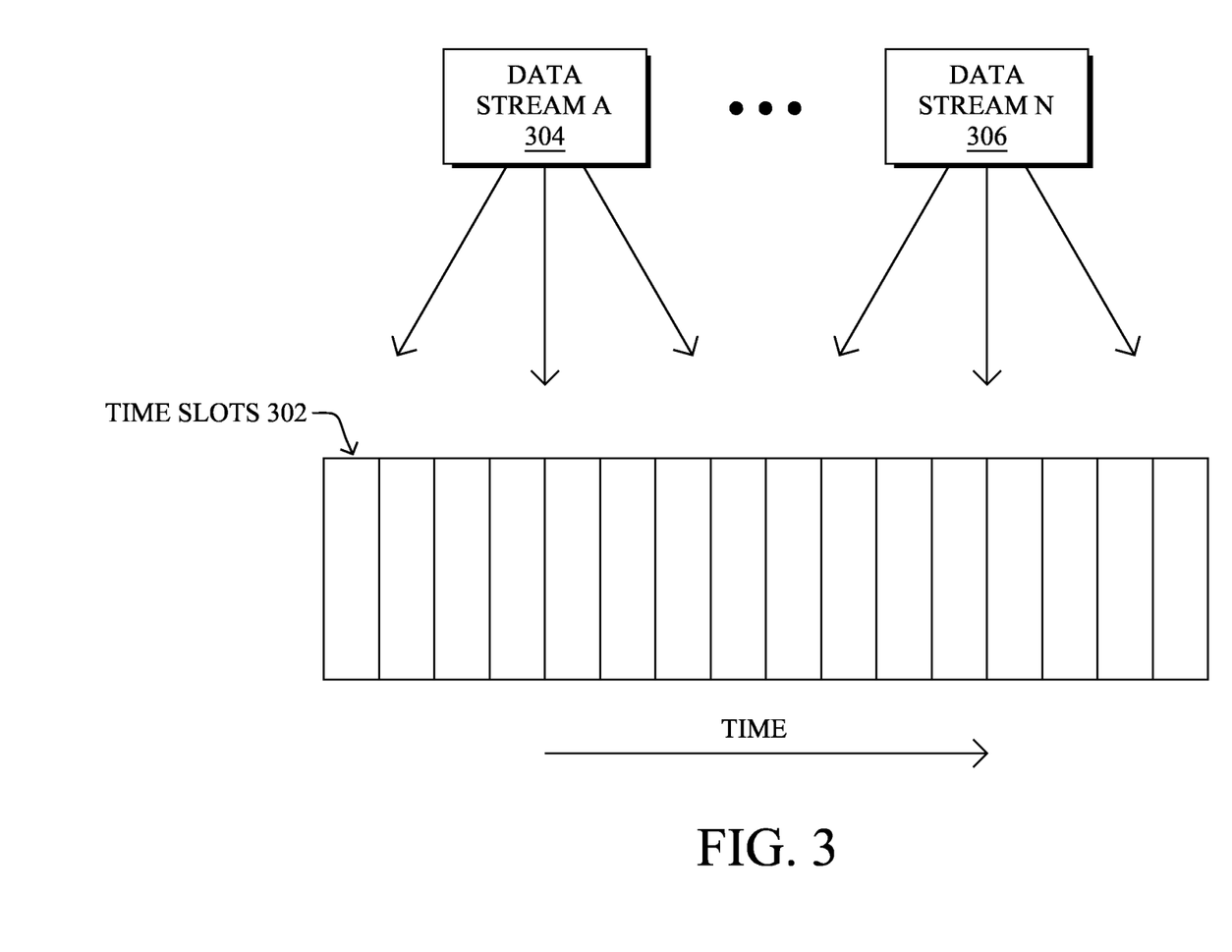
FIG. 3 illustrates an example of data streams being assigned to time slots.

FIG. 3 illustrates an example of data streams being assigned to time slots by a PCE, according to one embodiment. As shown, data transmittal may be divided into any number of time slots 302 during which a packet may be transmitted. Data packets from any number of data streams 304-306 (e.g., a first through nth data stream) may then be assigned by the PCE to time slots 302, to schedule the delivery of the packets from the various data streams. For example, a packet from data stream 304 may be assigned to a first time slot, followed by assigning a packet from data stream 306 to a second time slot, etc. In some cases, the assigned schedule may be repeated any number of times in a cyclical manner, to deliver the packets present in data streams 304, 306.

Figure 4:
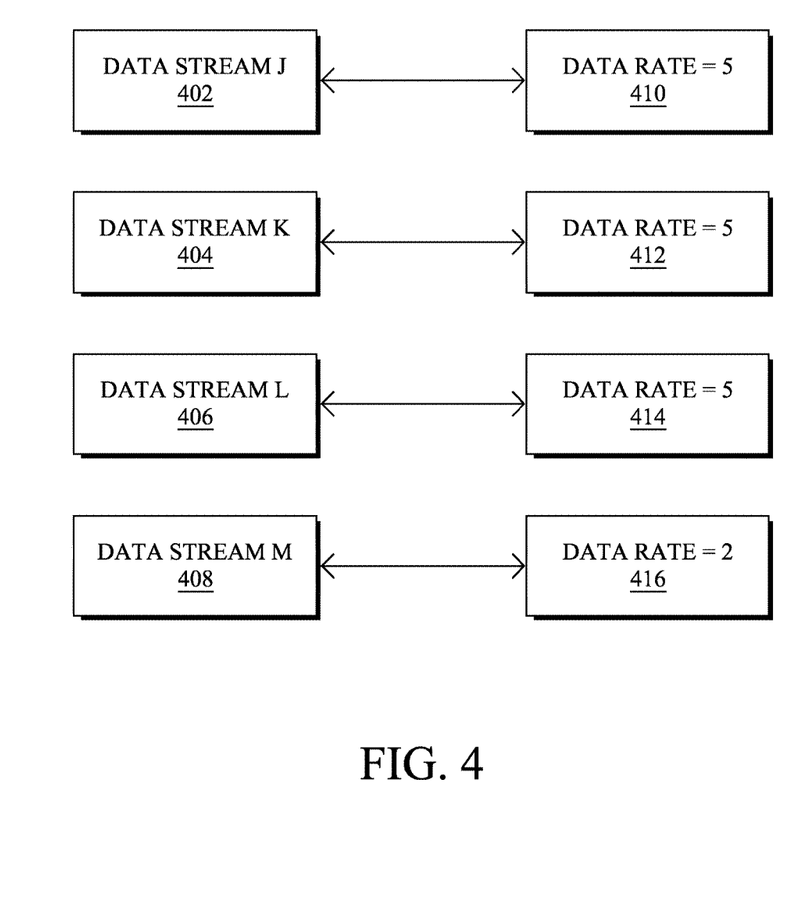
FIG. 4 illustrates an example of data streams having associated data rates.

As illustrated in the example of FIG. 4, data streams may have varying data rates within a network. For example, assume that a set of data streams to be scheduled for delivery by a PCE includes data streams 402-408. Also, assume that data streams 402-408 have varying data rates 410-416, respectively. In such cases, scheduling the transmittal of packets from each of data streams 402-408, while maintaining their respective data rates 410-416, becomes paramount in a deterministic network. In particular, scheduling the delivery of packets from data streams having different data rates can lead to an increase in network jitter (e.g., the delivery of packets from a given data stream on a non-periodic basis).

In general, jitter can be defined mathematically using the concept of entropy. For example, jitter present in the $i^{th}$ data flow may be defined as follows:

$$J_i = \log \sqrt{\frac{\sum_{k=1}^{n_i} (X_k^{(i)})^2}{n_i}} \qquad (1)$$

where $X_k^i$ is the $k^{th}$ interval among packets of $i^{th}$ flow and $n_i$ is the total number of packets from the $i^{th}$ flow in the period. With this definition (log of the second moment of the packet intervals), it is possible to demonstrate that the following hold:

$$\sum_{i=1}^{K} 2^{-J_i} \leq 1 \qquad (2)$$

$$J = \sum_{i=1}^{K} r_i J_i \geq H \qquad (3)$$

Basically, (2) is the Kraft's inequality transposed to Jitter as defined in (1), and (3) is the pondered sum of jitter of all flows (flow i has rate $r_i$) that is always more than a minimum value which we call entropy (H). As in information theory, entropy is reached when $J_i$ is $\log(1/r_i)$.

Figure 5:
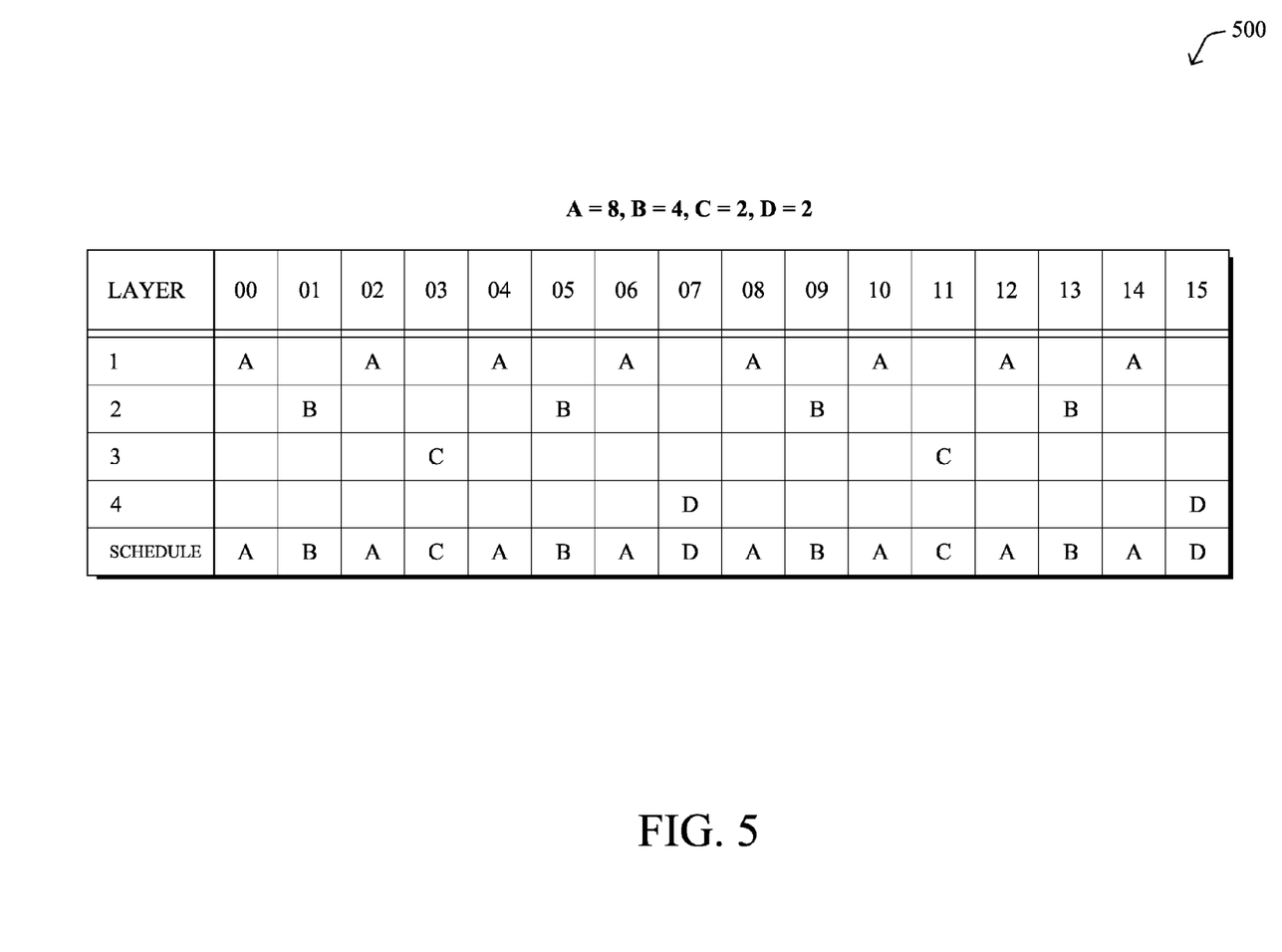
FIG. 5 illustrates an example packet delivery schedule.

One way to schedule packet delivery without jitter is to imposing a condition that all data streams adopt a $2^n$ time period and $2^n$ data rate. As shown in the example of FIG. 5, assume that data stream A has a data rate of 8, data stream B has a data rate of 4, and data streams C and D have data rates of 2, respectively. In such a case, a deterministic binary scheduler may assign packets from the data streams in the following manner. First, all $2^n$ time slots (e.g., time slot 0, 2, 4, etc.) are grouped within a first layer. Next, all 4n+1 slots (e.g., time slots 1, 5, 9, etc.) are grouped within a second layer. This process is then repeated any number of times until a sufficient number of time slots is allocated. Each of the data rates is then assigned to a corresponding layer based on its data rate, thereby forming the final schedule for packet delivery.

By definition, if a data stream belongs only to a single level, it has zero jitter and no extra buffering is required in case of shifts in the scheduling. Thus, in the case of requiring data steams to have $2^n$ periods and data rates, jitter is reduced. However, such a requirement also places a large constraint on the data rates.

As shown below, the power-of-two condition is not necessary, but is merely a simplification for reducing jitter. For example, each periodic stream can be represented as a natural number series:

$$\{A\} = \phi + \Sigma_{0 \leq j < k} a_j(k+j) \qquad (4)$$

where $\phi$ is the initial shift (also called phase), k is the period and $a_j$ is an indicator function whose domain is $\{0,1\}$ that describes which slots of the period are taken by the stream. Thus $\Sigma_{0 \leq j < k} a_j = R$, the rate of the stream. Now, for each pair of series $\{A_1\}$ and $\{A_2\}$ with periods $k_1$ and $k_2$, there's always at least a number that belong to both of them (the least common multiple). If this is translated to data streams, this means that periodic streams with any period will always collide sooner or later.

The case where the periods of the data rates are multiples of one another provides a special one where all slots of the slowest stream will collide. However, this can be exploited. In particular, by setting different phases $\phi$, the slots of the streams will never collide. Therefore the power-of-2 condition is a constraint that is not necessary. A sufficient condition then for slots not to be contended is for stream periods to be multiples and streams to be shifted among each other.

Figure 6:
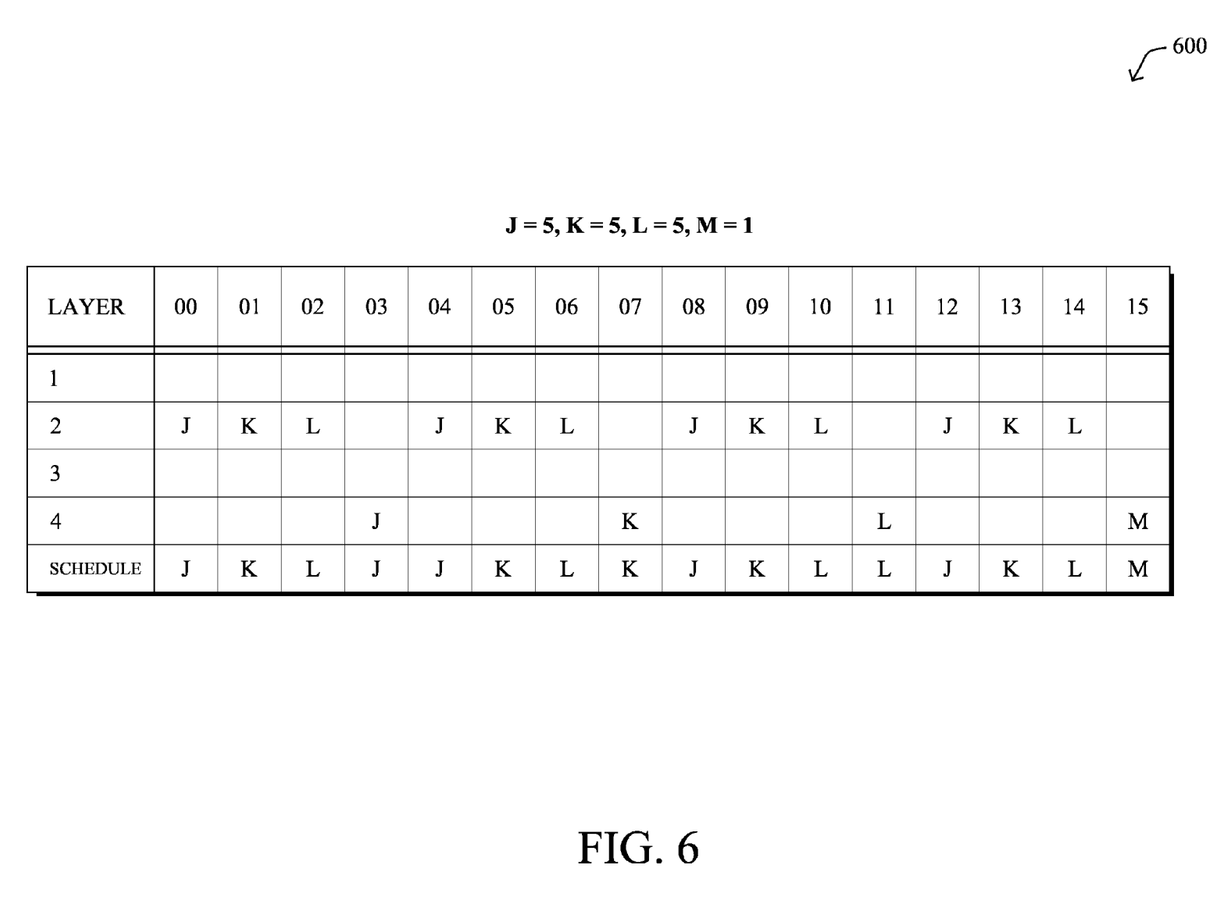
FIG. 6 illustrates an example packet delivery schedule exhibiting jitter.

FIG. 6 illustrates an example of a packet delivery schedule 600 exhibiting jitter. In some cases, the $2^n$ constraints discussed above may be eliminated by allowing a given data stream to belong to multiple layers. For example, consider a case where data streams J-L each have a data rate of 5 and data stream M has a data rate of 1. To schedule the delivery of packets from these streams, the data streams may be treated as the combination of different signals. Using the same binary scheduling techniques described with respect to FIG. 5, a given stream having a data rate of 5 may be viewed as being composed of a layer 1 signal and a layer 4 signal. Thus, 4 of 16 time slots are allocated to the signal from the first layer and 1 of 16 time slots are allocated to the signal from the fourth layer, which results in a total allocation of 5 of 16 time slots. Jitter is also increased over that of the example in FIG. 5. For example, data stream J has an irregular scheduling in schedule 600. Accordingly, removing the power-of-2 condition with a binary scheduler also results in the potential increase in jitter.

As noted above, the presence of jitter increases buffering requirements and is of particular importance in the context of deterministic networks.

Hierarchical Scheduler for Deterministic Networking

The techniques herein provide a scheduling technique for a deterministic network that reduces the presence of jitter in the finalized schedule. In some aspects, a Huffman tree may be constructed based on the data rates of the data flows to be scheduled. For a given parent node in the tree, data slots are then evenly distributed among its child nodes to assign the data streams to the available time slots. In doing so, a jitter-free time schedule or reduced-jitter schedule may be generated.

Specifically, according to one or more embodiments of the disclosure as described in detail below, a device identifies a set of data stream rates for a plurality of data streams. A Huffman tree is constructed for data transmission time slots based on the set of data stream rates. A number of time slots assigned to a parent node in the tree are determined and evenly distributed to child nodes of the parent node, to assign the time slots to the data streams.

Illustratively, the techniques described herein may be performed by hardware, software, and/or firmware, such as in accordance with the routing and scheduling process 248/248a, which may contain computer executable instructions executed by the processor 220 (or independent processor of interfaces 210) to perform functions relating to the techniques described herein. For example, the techniques herein may be treated as extensions to conventional protocols, such as the various wired or wireless communication protocols, and as such, may be processed by similar components understood in the art that execute those protocols, accordingly.

Operationally, the techniques herein construct a Huffman tree based on the data rates of the various data streams. Time slots associated with a particular parent node in the tree are then evenly distributed to the child nodes of the parent to form the finalized schedule.

Figure 7:
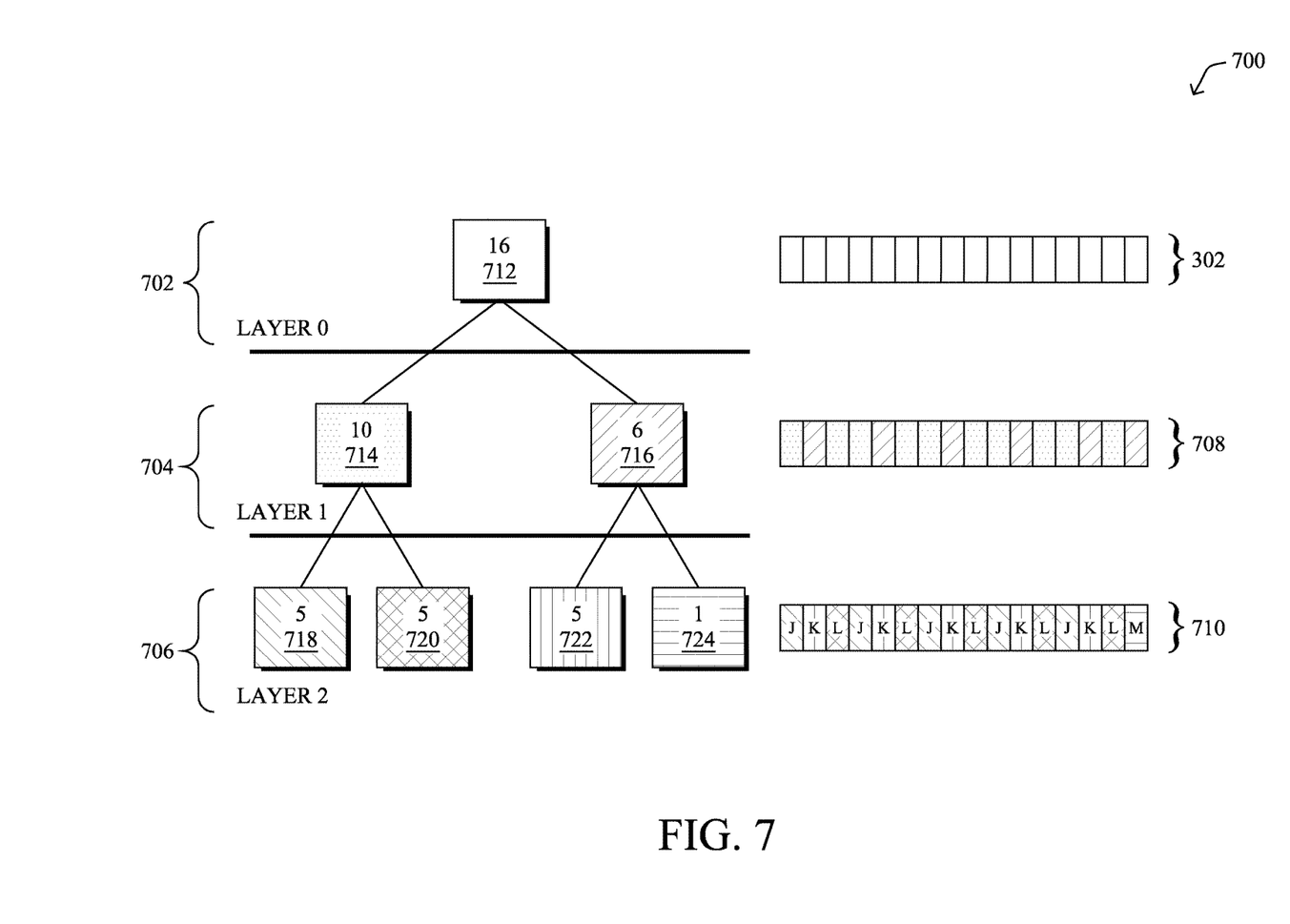
FIG. 7 illustrates an example of data streams being assigned to time slots based on their data rates.

FIG. 7 illustrates an example of data streams being assigned to time slots based on their data rates, according to various embodiments. First, a set of data streams is received and their corresponding data rates are used to generate a Huffman tree. For example, assume that data streams 402-408 from FIG. 4 are used to generate the illustrative Huffman tree 700. In general, a Huffman tree is a frequency sorted binary tree that is constructed from the bottom up. As shown, for example, data rates 410-416 may be sorted and grouped in pairs to form the base layer 706 of Huffman tree 700 (e.g., as nodes 718-724). Parent nodes are then assigned to each pair in base layer 706 that combine the frequencies/data rates of the child nodes in a given pair. For example, the overall data rate of data streams L, M (e.g., nodes 722-724) is six (e.g., 5+1), which is assigned to parent node 716 in layer 704. Similarly, node 714 is assigned a rate of ten based on its child nodes 718-720. This process continues until a root node 712 is formed at a top level 702, which combines all of the data rates. As shown, root node 712 has an overall data rate of sixteen (e.g., sixteen time slots 302), which may be used as a full cycle.

According to various embodiments, an iterative process may be applied after the construction of Huffman tree 700, to generate the finalized schedule by assigning the data streams to the time slots 302. The iterative process begins at the root node of the tree (e.g., root node 712 of layer 702 in FIG. 7) and proceeds down to the next highest layer (e.g., layer 704). This process may be repeated any number of times so long as the current layer of the tree under analysis contains at least one parent node. At each parent layer, the number of time slots to be associated with a given parent node is determined. For example, as shown in schedule 708, time slots may be assigned to each of the parent nodes 714, 716 and evenly distributed according to their respective totals. In one embodiment, the slots of a given parent node may be evenly assigned to its child nodes by performing integer division between the total number of slots/flow rates of the two child nodes (e.g., the ten time slots of node 714 and the six time slots of node 716 are evenly distributed among the sixteen time slots of root node 712).

After the analysis of level 702 completes, the next highest layer in Huffman tree 700 is analyzed (e.g., layer 704). Since layer 704 also contains parent nodes, further timeslot assignments are made to assign their child nodes 718-724 to schedule 708. In one embodiment, this assignment is performed evenly among the children of a given parent. For example, parent node 714 has ten total time slots in schedule 708 and two child nodes (e.g., nodes 718, 720). Assignment of nodes 718, 720 may be performed evenly to the time slot in schedule 708 associated with node 714 (e.g., by attempting to assign the time slots such that they are evenly spaced across the schedule). Similarly, nodes 722, 724 may be assigned evenly to the time slots in schedule 708 associated with their parent node 716. Since nodes 718-724 are not parent nodes, the process then ends, resulting in the finalized schedule 710.

As will be appreciated the finalized schedule 710 contains less jitter than would result using other techniques. For example, a deterministic binary scheduler would produce the alternate schedule JKLJJKLKJKLLJKLM, which contains more jitter than that of schedule 710. Preliminary testing has shown a decrease of up to 40% buffer savings using the techniques herein over deterministic binary scheduling when cycle sizes are power-of-2. When this requirement is dropped to allow cycle sizes to be computed as a function of flow rates, preliminary testing has shown decreases of up to 60% buffer savings over that of a deterministic binary scheduler.

In alternate implementations, weighted fair queuing (WFQ) may be applied at each parent node in the constructed Huffman tree to assign time slots to its child nodes, instead of evenly distributing the time slots. WFQ generally operates by taking n-number of data stream as input, each having its own weight (e.g., $w_1 \ldots w_n$). If the link data rate is R, a given data flow (e.g., the ith data flow) will have an average data rate as follows:

$$\text{data\_rate}_i = \frac{Rw_i}{\sum_{j=1}^{N} w_j}$$

Thus, a given data stream is allotted a shared data rate as a function of its weighting when using WFQ.

Using WFQ instead of evenly distributing time slots to the child nodes in the tree may also increase the amount of jitter in comparison to evenly distributing the time slots. For example, assume that data streams A, B, C, D have data rates of 5, 2, 2, and 1, respectively. Construction of a Huffman tree results in the following:

TABLE 1

| Node | Data Rate | Parent? |
|---|---|---|
| D | 1 | Y |
| C | 2 | Y |
| Y | 3 | X |
| B | 2 | X |
| X | 5 | Root |
| A | 5 | Root |
| Root | 10 | None |

As shown above in Table 1, parent nodes Root, X, and Y are constructed in the Huffman tree are generated by successively grouping nodes in order of their data rates. For example, node Y is generated as the parent of nodes/data rates C and D and has a data rate that combines those of C and D (e.g., 2+1=3).

If WFQ is applied to the tree of Table 1, processing will proceed as described in Table 2 below.

TABLE 2

| Round | Parent Node | Assignments |
|---|---|---|
| 1 | Root | AXAXAXAXAX |
| 2 | X | ABABAYAYAY |
| 3 | Y | ABABACACAD |

As shown in Table 2, applying WFQ to the Huffman tree produces a certain amount of jitter. In particular, WFQ favors large streams over small. For example, streams B and C shown in the final schedule in Table 2 experience jitter based on their corresponding assignments in the finalized schedule.

Assigning time slots evenly to the child nodes from Table 1 will proceed as described in Table 3 below.

TABLE 3

| Round | Parent Node | Assignments |
|---|---|---|
| 1 | Root | AXAXAXAXAX |
| 2 | X | ABAYABAYAY |
| 3 | Y | ABACABACAD |

As shown in Table 3, evenly assigning time slots to child nodes instead of applying WFQ begins to produce a different schedule starting at round two (e.g., during analysis of parent node X). At the final schedule, it can be seen from Tables 2-3 that evenly distributing the time slots among the child nodes decreases jitter of using WFQ.

Figure 8:
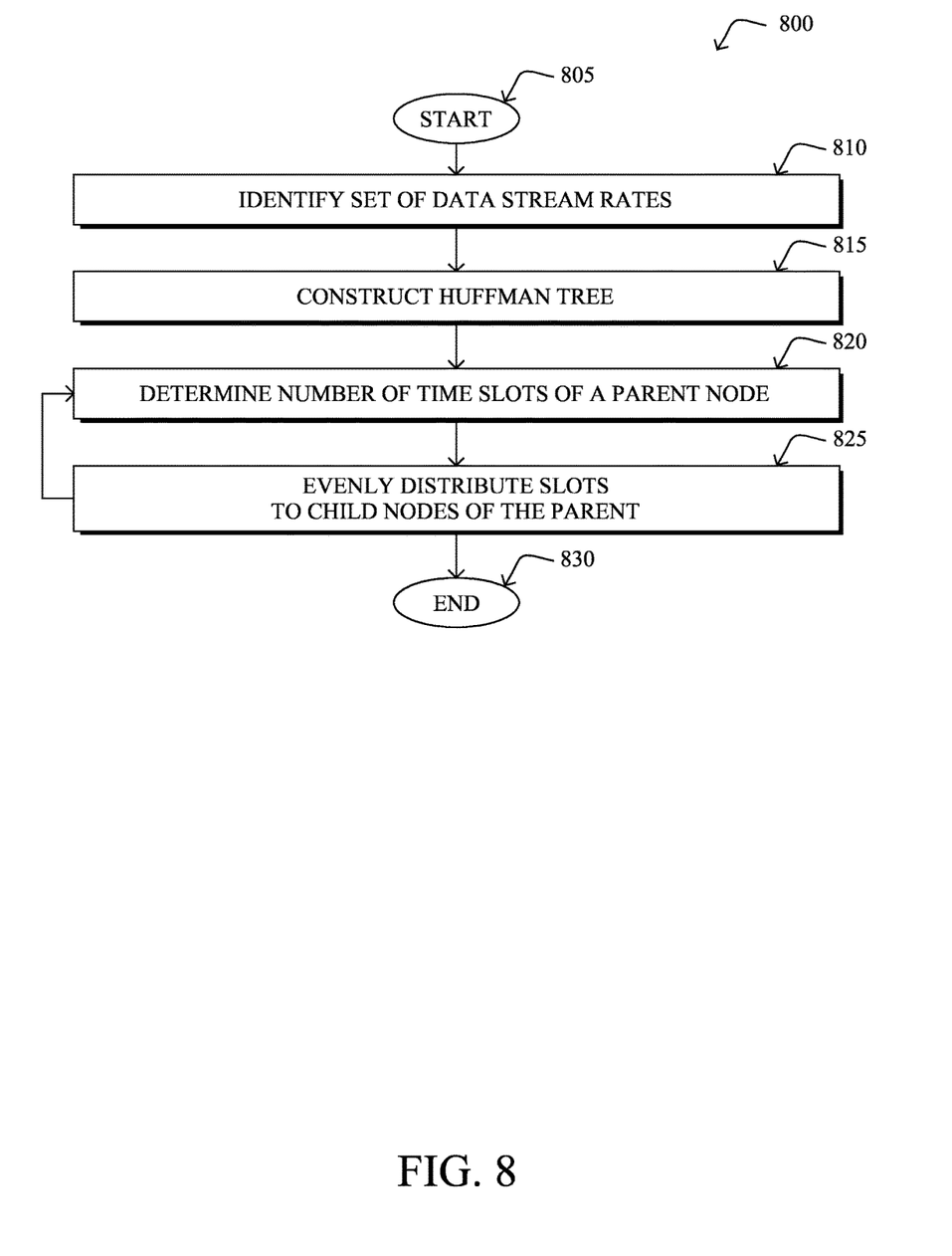
FIG. 8 illustrates an example simplified procedure for assigning data streams to transmission time slots.

FIG. 8 illustrates an example simplified procedure for dynamically enabling routing devices in a shared-media communication network in accordance with one or more embodiments described herein. The procedure 800 may start at step 805, and continues to step 810, where, as described in greater detail above, a set of data stream rates are identified. For example, a set of n-number of data streams may be identified having up to n-number of different data rates.

At step 815, a Huffman tree is constructed using the identified data rates of the n-number of data streams. As described above, the Hoffman tree is constructed as a binary tree from the bottom up by first sorting the data streams by their respective data rates. Next, the two data streams having the lowest data rates are grouped to form a parent node having a data rate that combines that of the two streams. This parent node then replaces the two streams/nodes in the sorting and the process repeats until a root node is formed that has a data rate that combines that of all of the data streams. Huffman tree 700 shown in FIG. 7 illustrates one example of such a construction.

At step 820, a number of time slots are determined for a given parent node in the constructed Huffman tree, as described in greater detail above. For example, as shown in FIG. 7, time slots 302 are determined for root node 712 (e.g., sixteen time slots are allotted for root node 712 based on the node having a combined data rate of sixteen).

At step 825, time slots associated with a particular parent node are evenly distributed to the child nodes of the parent, as detailed above. For example, as shown in FIG. 7, time slots 302 (e.g., the time slots associated with root node 712) are assigned to nodes 714, 716 by evenly allocating time slots to nodes 714, 716 according to their respective data rates (e.g., while only six time slots are allocated to node 716, these slots are distributed as evenly as possible among the sixteen total time slots). Thus, a relatively even distribution of time slots for nodes 714, 716 is formed in schedule 708.

In some embodiments, steps 820 and 825 may be repeated iteratively for each parent node in the Huffman tree constructed in step 815. Again referring to the example of FIG. 7, steps 820 and 825 may be repeated for nodes 714, 716 to form a finalized schedule 710 for data streams J-M. Procedure 800 then ends at step 830.

It should be noted that while certain steps within procedure 800 may be optional as described above and that the steps shown in FIG. 8 are merely examples for illustration. Certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a traffic scheduler that reduces jitter and, consequently, the amount of buffering needed to route the traffic. In particular, attempting to evenly distribute time slots to child nodes produces a fairer schedule for streams having lower data rates. In addition, the techniques herein also eliminate the need for a power-of-2 requirement, allowing for variable data streams to be used.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with respect to a PCE. However, the embodiments in their broader sense are not as limited, and may, in fact, be performed by other network devices. In addition, while certain protocols are shown, such as deterministic Ethernet, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   identifying, at a device, a set of data stream rates for a plurality of data streams;
   constructing, by the device, a Huffman tree for data transmission time slots based on the set of data stream rates by sorting the data streams by respective data rates;
   determining, by the device, a number of time slots assigned to a parent node in the tree; and
   using, by the device, the Huffman tree to evenly distribute time slots to child nodes of the parent node to assign the time slots to the data streams by:
      grouping the data rates into pairs to form a base layer of child nodes,
      assigning parent nodes to each pair of data rates in the base layer that combines frequencies and data rates of the child nodes in a given pair, and
      continuing grouping and assigning until a root node is formed.

2. The method as in claim 1, further comprising:
   determining a cycle size for the time slots based on the data stream rates.

3. The method as in claim 2, wherein the set of time periods is determined using a least-squares regression.

4. The method as in claim 2, wherein the cycle size is a multiple of the data stream rates.

5. The method as in claim 1, wherein a cycle size of the data transmission time slots is variable.

6. The method as in claim 5, wherein the cycle size of the data transmission time slots is a power of two.

7. The method as in claim 1, wherein the device is a path computation element (PCE).

8. An apparatus, comprising:
   one or more network interfaces to communicate with a network;
   a processor coupled to the network interfaces and adapted to execute one or more processes; and
   a memory configured to store a process executable by the processor, the process when executed operable to:
      identify a set of data stream rates for a plurality of data streams;
      construct a Huffman tree for data transmission time slots based on the set of data stream rates by sorting the data streams by respective data rates;
      determine a number of time slots assigned to a parent node in the tree; and
      use the Huffman tree to evenly distribute time slots to child nodes of the parent node by:
         grouping the data rates into pairs to form a base layer of child nodes,
         assigning parent nodes to each pair of data rates in the base layer that combines frequencies and data rates of the child nodes in a given pair, and
         continuing grouping and assigning until a root node is formed.

9. The apparatus as in claim 8, wherein the process when executed is further operable to:
   determine a cycle size for the time slots based on the data stream rates.

10. The apparatus as in claim 9, wherein the set of time periods is determined using a least-squares regression.

11. The apparatus as in claim 9, wherein the cycle size is a multiple of the data stream rates.

12. The apparatus as in claim 8, wherein a cycle size of the data transmission time slots is variable.

13. The apparatus as in claim 12, wherein the cycle size of the data transmission time slots is a power of two.

14. The apparatus as in claim 8, wherein the process when executed is further operable to:
   compute a network path for the data streams.

15. A tangible, non-transitory, computer-readable media having instructions encoded thereon, the instructions when executed by a processor operable to:
   identify a set of data stream rates for a plurality of data streams;
   construct a Huffman tree for data transmission time slots based on the set of data stream rates by sorting the data streams by respective data rates;
   determine a number of time slots assigned to a parent node in the tree; and
   use the Huffman tree to evenly distribute time slots to child nodes of the parent node by:
      grouping the data rates into pairs to form a base layer of child nodes,
      assigning parent nodes to each pair of data rates in the base layer that combines frequencies and data rates of the child nodes in a given pair, and
      continuing grouping and assigning until a root node is formed.

16. The computer-readable media as in claim 15, wherein the instructions when executed are further operable to:
   determine a cycle size for the time slots based on the data stream rates.

17. The computer-readable media as in claim 16, wherein the set of time periods is determined using a least-squares regression.

18. The computer-readable media as in claim 16, wherein the cycle size is a multiple of the data stream rates.

19. The computer-readable media as in claim 15, wherein the software when executed is further operable to:
   compute a network path for the data streams.

20. The computer-readable media as in claim 15, wherein a cycle size of the data transmission time slots is variable.

* * * * *